[12] United States Patent
Nafus, Jr. et al.

(10) Patent No.: US 7,135,066 B1
(45) Date of Patent: Nov. 14, 2006

(54) TITANIUM WHITE PAINT FOR ICE SURFACES

(75) Inventors: James Nafus, Jr., P.O. Box 39, Peapack, NJ (US) 07977; James Nafus, Sr., Chester, NJ (US)

(73) Assignee: James Nafus, Jr., Peapack, NJ (US)

( * ) Notice: Subject to any disclaimer, the term of this patent is extended or adjusted under 35 U.S.C. 154(b) by 0 days.

(21) Appl. No.: 11/395,578

(22) Filed: Mar. 31, 2006

(51) Int. Cl.
*C09D 1/00* (2006.01)
*C09C 1/02* (2006.01)
*C09C 3/00* (2006.01)

(52) U.S. Cl. .................. 106/447; 106/449; 106/464; 106/465

(58) Field of Classification Search ............... 106/447, 106/449, 464, 465
See application file for complete search history.

(56) References Cited

U.S. PATENT DOCUMENTS

| | | | |
|---|---|---|---|
| 2,170,800 A | 8/1939 | Barton | |
| 2,260,826 A | 10/1941 | Booge | |
| 2,361,986 A | 11/1944 | Booge | |
| 3,528,838 A | 9/1970 | Brixner | |
| 3,832,206 A | 8/1974 | Libera et al. | |
| 5,167,705 A | 12/1992 | Coughlan | |
| 5,356,463 A * | 10/1994 | Kober et al. | 106/2 |
| 5,834,067 A * | 11/1998 | Rodely | 427/469 |
| 5,886,069 A | 3/1999 | Bolt | |
| 6,572,694 B1 | 6/2003 | Towe | |
| 6,743,286 B1 * | 6/2004 | Wen et al. | 106/436 |
| 2003/0121451 A1 | 7/2003 | Tanabe et al. | |
| 2004/0202601 A1 | 10/2004 | Wen et al. | |

* cited by examiner

*Primary Examiner*—Anthony J. Green
(74) *Attorney, Agent, or Firm*—Patricia M. Mathers; Thomas L. Bohan

(57) ABSTRACT

Ice paint for painting ice surfaces. The ice paint comprises rutile TiO2, precipitated calcium carbonate manufactured to a particle size of 0.8 microns, and water. The rutile TiO2 is combined with the precipitated calcium carbonate in a ratio of at least 1 part rutile TiO2 to 6.5 parts precipitated calcium carbonate.

2 Claims, No Drawings

TITANIUM WHITE PAINT FOR ICE SURFACES

BACKGROUND INFORMATION

1. Field of the Invention

The invention relates to the field of paints. More particularly, it relates to paints for use on ice surfaces. More particularly yet, it relates to a white paint for ice surfaces.

2. Description of the Prior Art

Ice surfaces are frequently painted in sports arenas, such as arenas for ice hockey, figure skating, or other activies carried out on ice. The pigment for the white paint is a titanium white, a widely used white pigment with high brightness and a very high refractive index. TiO2 is a very effective opacifier in powder form, and, when used in paints, provides paint with high whiteness and opacity.

Several paints are known for use as ice paints. One ice paint comprises ground calcium carbonate, without any whitener added to the suspension. The disadvantage of this ice paint is that it does not have the desired whiteness and brightness. Another ice paint comprises anatase TiO2 and calcined kaolin as a filler. This ice paint is bright white, but is sensitive to ultra-violet (UV) light because the anatase TiO2 reflects the UV light, allowing the UV to deteriorate the pigment particles and causing the paint to become more translucent, that is, less opaque, with exposure to UV radiation. The formulation with calcined kaolin has a further disadvantage for use in ice arenas. These ice surfaces are groomed with an ice resurfacer. The kaolin is an abrasive substance, with a Moh hardness of between 6 and 8, compared to 3 for calcium carbonate. Resurfacing ice painted with such ice paint causes the blades of the ice resurfacer to become prematurely dull, resulting in higher operational costs for the ice arena.

What is needed, therefore, is a bright white paint with high opacity for use on ice surfaces. What is further needed is such a paint that does not deteriorate when exposed to UV radiation. What is yet further needed is such a paint that does not lead to premature dulling of blades on ice resurfacing equipment.

BRIEF SUMMARY OF THE INVENTION

The invention is a paint comprising a rutile TiO2 whitener combined with precipitated calcium carbonate as a filler. The rutile TiO2 is in a liquid form and the precipitated calcium carbonate has a particle size of 0.8 microns.

DETAILED DESCRIPTION OF THE INVENTION

The present invention will now be described more fully in detail. This invention should not be construed as limited to the embodiments set forth herein; rather, they are provided so that this disclosure will be complete and will fully convey the scope of the invention to those skilled in the art.

The invention is an ice paint with superb brightness and whiteness properties, and that is resistant to deterioration caused by UV radiation. The preferred embodiment of the invention is a mixture of primarily the whitener rutile TiO2 and the filler precipitated calcium carbonate. The rutile TiO2 is provided in a liquid form, combined with a surfactant, whereby the rutile TiO2 is 70% by weight of the combined whitener and surfactant. An anti-foam agent or surfactant may be added to the whitener, if needed. One example of a suitable rutile TiO2 whitener is Keysperse 3, which is available from Keystone Aniline Corporation. An example of a suitable calcium carbonate filler is Albafil from Specialty Minerals. The precipitated calcium carbonate is manufactured to a particle size of having a median diameter of 0.8 microns and has a brightness of about 97. The rutile TiO2 has a brightness of about 99. This size was determined to be small enough to provide a good fit between the filler particles and the rutile TiO2 particles. Larger particle size of the precipitated calcium carbonate interferes with a good mesh between the precipitated calcium carbonate particles and the rutile TiO2 particles. The larger precipitated calcium carbonate particles tend to fall out of suspension quickly. The tighter mesh provided by the 0.8 micron particle size of the filler not only helps to keep the precipitated calcium carbonate in suspension, it also lends greater opacity to the paint product. It would be possible to use precipitated calcium carbonate with an even smaller particle size, but that would increase the cost of the paint, without providing a corresponding increase in the whiteness and brightness quality of the paint.

The preferred embodiment of the ice paint is mixed at a weight ratio of 16.3% precipitated calcium carbonate, 2.7% combined rutile TiO2 and surfactant, and 81% water. An example composition of the ice paint comprises 150 lbs of precipitated calcium carbonate, 24 lbs of rutile TiO2 and surfactant (16.8 lbs actual weight of rutile TiO2), and 90 gallons of water. The ratio of rutile TiO2 to precipitated calcium carbonate is critical. At least 22 lbs must be added to 150 lbs of the precipitated calcium carbonate to achieve the desired quality. In other words, the amount of rutile TiO2 in a combined whitener and precipitated calcium carbonate mix must be at least 13.3%, and preferably, 13.8% by weight. A lesser amount of rutile TiO2 will reduce the opacity of the finished product. Adding a greater amount of the rutile TiO2 will not adversely affect the finished product, but increases the cost, without significantly increasing the quality of the paint.

The use of the precipitated calcium carbonate as the filler provides a non-abrasive product in which the components of the paint stay in suspension longer than do most conventional ice paints. Because the precipitated calcium carbonate is non-abrasive, cutting into the ice will not lead to excessive, premature dulling of the blades on the ice surface treatment equipment.

It is understood that the embodiments described herein are merely illustrative of the present invention. Variations in the construction of the ice paint may be contemplated by one skilled in the art without limiting the intended scope of the invention herein disclosed and as defined by the following claims.

What is claimed is:

1. A paint for painting an ice surface, said paint comprising a mixture of a whitener and a filler, wherein said whitener is rutile TiO2 and said filler is precipitated calcium carbonate having a particle size of 0.8 microns, and wherein said whitener and said precipitated calcium carbonate are mixed with water at a weight ratio of 16.8% precipitated calcium carbonate, 2.7% combined rutile TiO2 and a surfactant, and 80.5% water.

2. The paint of claim 1, wherein said rutile TiO2 is 70% by weight of said combined TiO2 and said surfactant.

* * * * *